Figure 1:
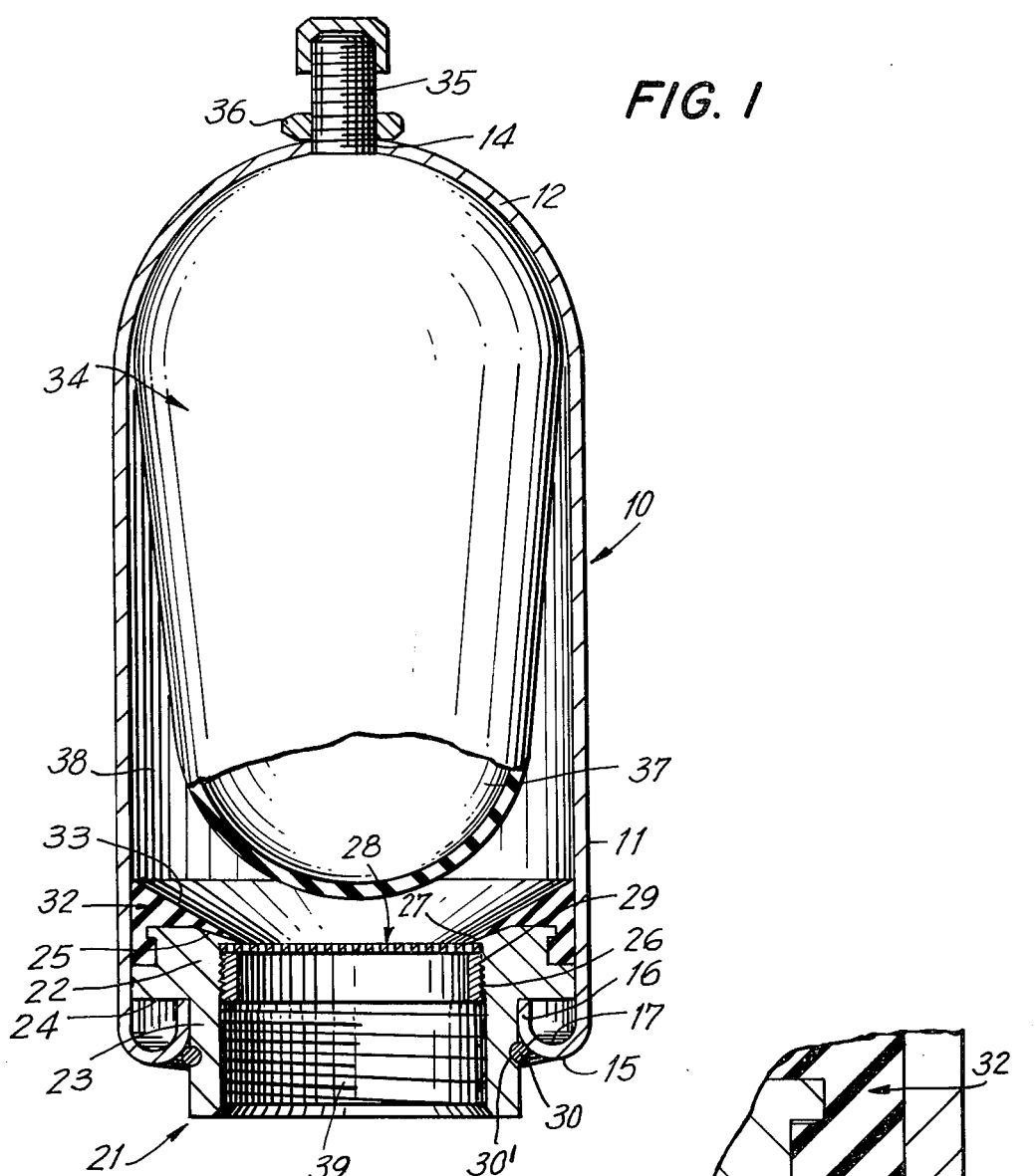

United States Patent [19]

Mercier

[11] 3,963,053

[45] June 15, 1976

[54] PRESSURE VESSEL

[76] Inventor: Jacques H. Mercier, 49 rue de Naples, Paris, France

[22] Filed: July 10, 1974

[21] Appl. No.: 487,167

[52] U.S. Cl. ................................................ 138/30
[51] Int. Cl.² ........................................ F16L 55/04
[58] Field of Search ........... 138/30; 92/164; 220/67, 220/85 B; 29/511, 422

[56] References Cited
UNITED STATES PATENTS

| | | | |
|---|---|---|---|
| 608,349 | 8/1898 | Sterne | 29/511 |
| 2,792,022 | 5/1957 | Mercier | 138/30 |
| 3,509,916 | 5/1970 | Mercier | 138/30 |
| 3,549,445 | 12/1970 | McMahon | 29/511 X |

*Primary Examiner*—Richard E. Aegerter
*Assistant Examiner*—James E. Bryant, III
*Attorney, Agent, or Firm*—Arthur B. Colvin

[57] ABSTRACT

The invention relates to a pressure vessel comprising a container of rigid material having a cylindrical portion defining an open mouth which is formed by reversely bending inwardly the end of said cylindrical portion to form a cylindrical flange portion. The curved junction between the flange portion and the cylindrical container portion is a semi-circle, the flange portion extending parallel to the cylindrical container portion beyond a diametrical line between the ends of the semi-circular junction. A closure assembly comprising a cylindrical plug having a reduced diameter sleeve defining an annular shoulder is positioned in said container mouth, with said shoulder engaging the rim of said cylindrical flange, the latter being restrained from transverse inward movement by abutment against said sleeve.

1 Claim, 2 Drawing Figures

U.S. Patent   June 15, 1976   3,963,053

PRESSURE VESSEL

As conducive to an understanding of the invention, it is noted that where it is desired to form a pressure vessel and particularly a pressure accumulator, that is relatively inexpensive in cost, the number of elements employed and the number of manufacturing steps must be kept to a minimum.

Where to provide such low cost pressure vessel, a rigid shell or container is provided having one end open with a closure plug positioned therein and retained in place by merely inwardly bending the free end of the shell or container, due to the pressure in the container which would exert force against the closure plug to move it outwardly, if such force is applied in manner to exert a high degree of leverage against the inwardly bent flange, the latter is likely to spread and bend back to its original position, loosening the retention of the closure plug and permitting leakage of oil from the container and even more important, possible expulsion of the closure plate may occur with likelihood of injury to personnel and damage to equipment.

Where to prevent spreading of the flange back to its original position, a restraining washer is provided to limit the movement of such flange, the cost of the washer and the added assembly step adds to the cost of manufacture.

Where to avoid the need for such additional restraining washer the plug is conformed so as to abut against the root end of the flange to minimize the leverage applied thereto that would cause it to spread and bend back to its original position, due to the precise tolerances required the cost of manufacture is increased and even with close controls, precise tolerance cannot be maintained.

It is accordingly among the objects of the invention to provide a pressure vessel which may readily be formed with a minimum number of components and with relatively few operations and without need of precise tolerance during manufacture and which will dependably retain a closure plug in position by the use of an inwardly bent flange against the end of which the closure plug abuts with assurance that spreading movement of the flange is substantially restrained.

According to the invention, these objects are accomplished by the arrangement and combination of elements hereinafter described and more particularly recited in the claims.

Figure 2:
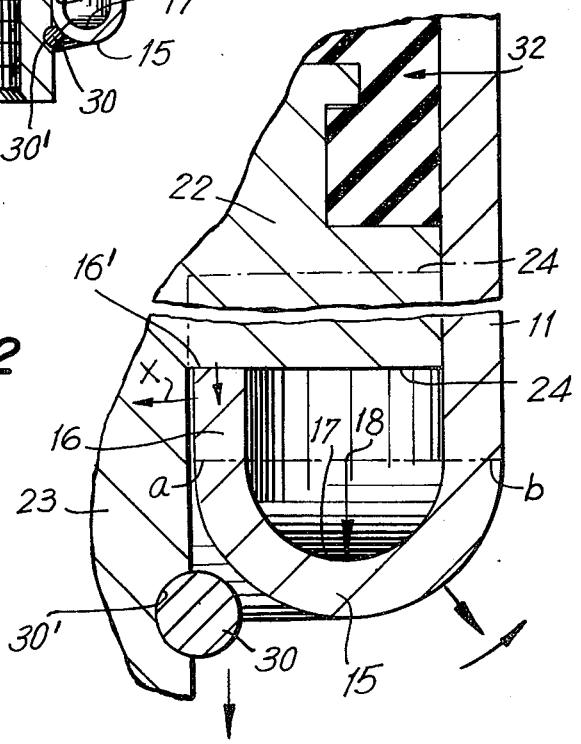

In the accompanying drawings in which is shown one of various possible embodiments of the several features of the invention:

FIG. 1 is a longitudinal sectional view of a pressure vessel according to the invention, and FIG. 2 is an enlarged detail view of a portion of the pressure vessel.

Referring now to the drawings, as shown in FIG. 1, the pressure vessel 10, illustratively a pressure accumulator, comprises a container of rigid material such as steel or aluminum capable of withstanding the pressure to which the unit will be subjected in use.

The container 10 is substantially cylindrical along the major portion of its length as at 11, being hemispherical at one end as at 12 and having an open mouth at its other end, axially aligned with an opening or port 14 in said end 12.

The mouth is formed by reversely bending inwardly, as at 15, the end of the cylindrical portion 11 of the container 10 to form a cylindrical flange portion 16.

As shown in greater detail in FIG. 2, the junction between the cylindrical container portion 11 and the cylindrical flange portion 16 is curved as at 17 and such curved portion 17 is a semi-circle, the diametrical line 18 between the ends a-b of which, extends at right angles to the longitudinal axis of the cylindrical container portion 11.

As is clearly shown in FIG. 2, the end of the cylindrical container portion 11 terminates at the end b of the diametrical line 18 and the flange 16 rises from the end a of said diametrical line 18.

Positioned in the container 10 is an outlet closure assembly 21 which comprises a cylindrical plug 22 having a reduced diameter sleeve 23 extending axially therefrom, and defining an annular abutment shoulder 24.

The plug 22 is of diameter just slightly smaller than the inner diameter of the cylindrical portion 11 of container 10 so as to fit snugly therein but capable of axial movement.

The inner surface of plug 22 is formed with a bowl-shaped depression 25, the floor of the depression 25 having an axial opening 26 of enlarged diameter outwardly of the floor to define an annular shoulder 27 against which the periphery of a perforated disc or screen 28 may be clamped by means of a threaded locking ring 29.

The plug 22 has an annular packing member 32 secured to its periphery on its inner surface to provide a seal between the plug 22 and the wall of the container. The inner surface 33 of the packing member 32 is desirably beveled and inclined downwardly from the wall of the container 10 to the periphery of the opening 26 in the floor of depression 25, across which screen 28 extends to receive the closed end of a deformable bladder 34 when the latter expands in use.

The bladder 34 is of deformable expandable material such as natural or synthetic rubber and is secured in the container by means of a gas fitting 35 in communication at one end with the interior of the bladder and having its other end extending through port 14 and clamped in place by lock nut 36.

The bladder 34 divides the container into two chambers, i.e., chamber 37 which is filled with gas through a valve in fitting 35 and a chamber 38 which is filled with a liquid such as oil through bore 39 of sleeve 23.

To assemble the pressure vessel above described, before the outlet closure assembly 21 is positioned in the container, the bladder 34 is secured in fixed position in the container with respect to port 14.

The closure assembly is then forced into the open mouth of the container with the shoulder 24 positioned inwardly from the end of cylindrical portion 11 as in the position shown by broken lines in FIG. 2.

Thereupon, the free end of the cylindrical portion 11 is reversely bent to the position shown in FIG. 2 so that the flange 16 extends parallel to cylindrical portion 11.

In normal operation of the pressure vessel, the bladder 34 is first charged with gas under pressure through fitting 35.

As a result, the bladder 34 will expand exerting force against packing 32 and screen 28 causing the closure assembly 21 to be forced outwardly.

Due to the small size of the openings in screen 28, movement of the bladder 34 thereagainst will not cause extrusion and cutting of the bladder.

Outward movement of the closure assembly 21 will be restrained by the abutment of annular shoulder 24 against the rim 16' of flange 16. A snap ring 30 is inserted into an annular groove 30' in the outer surface of sleeve 23 to restrain inward movement of the closure assembly when the pressure vessel is not pressurized.

After the bladder 34 is precharged as above described, a fluid such as oil under pressure greater than that of the gas pressure in bladder 34 is introduced through bore 39 into chamber 38 further to compress the gas in bladder 34.

Thereupon, a valve (not shown) controlling bore 39 is closed and the accumulator is ready for use in conventional manner.

Due to the introduction of oil under high pressure into chamber 38 with consequent increase of the gas pressure in bladder 34, the force exerted against the closure assembly will be relatively great. As a result, the force exerted by the shoulder 24 against rim 16' of flange 16 will tend to move such flange in a direction parallel to the direction of the applied force.

This would tend to cause the reversely bent portion 17 to pivot outwardly, the pivot being located at the outer end *b* of the diametrical line 18.

However, with reference to FIG. 2, it is to be noted that as the flange 16 rises above the end *a* of diametrical line 18, it will tend to move inwardly as shown at "X".

As a result the flange 16 will abut against sleeve 23 which will restrain such inward movement thereof and consequently pivotal movement of the reversely bent portion 17 about pivot point *b* will also be restrained.

As a consequence there will be substantially no spreading of the mouth of the container which would cause impairment of the seal provided by packing 32 and the closure assembly will dependably remain in position.

Having thus descirbed my invention what I claim as new and desire to secure by Letters Patent of the United States is:

1. A pressure vessel comprising a container of rigid material having a cylindrical portion having an open end reversely bent inwardly relative to the cylindrical portion and terminating in an annular flange having a rim at its free edge, the reversely bent end between said cylindrical portion and said flange defining a semicircular portion, said flange extending substantially parallel to the cylindrical container portion beyond a diametrical line between the ends of the semi-circular portion, a closure assembly in said container, said assembly comprising a cylindrical plug having a reduced diameter sleeve extending axially therefrom and defining an annular shoulder, said shoulder engaging the rim of said flange, said reduced diameter sleeve being received through said annular flange, the latter being restrained from transverse inward movement by abutment against said sleeve, said container having a deformable bladder therein defining a gas chamber on opposed sides thereof and passage means leading into each of said chambers.

* * * * *